United States Patent [19]

Jones

[11] 4,043,104
[45] Aug. 23, 1977

[54] MOWER BLADE ASSEMBLY FOR A LAWN MOWER

[75] Inventor: Kenneth R. Jones, Thiensville, Wis.

[73] Assignee: Allis-Chalmers Corporation, Milwaukee, Wis.

[21] Appl. No.: 755,155

[22] Filed: Dec. 29, 1976

Related U.S. Application Data

[63] Continuation of Ser. No. 600,781, July 31, 1975, abandoned.

[51] Int. Cl.² .............................................. A01D 55/18
[52] U.S. Cl. ...................................................... 56/295
[58] Field of Search .......................... 56/295, 255, 17.5

[56] References Cited

U.S. PATENT DOCUMENTS

| | | | |
|---|---|---|---|
| 2,083,103 | 6/1937 | Steiner | 56/255 |
| 2,786,322 | 3/1957 | McEvers | 56/295 |
| 2,957,295 | 10/1960 | Brown | 56/17.5 |
| 3,093,952 | 6/1963 | Bonser | 56/295 |
| 3,103,093 | 9/1963 | House, Jr. | 56/295 |
| 3,327,460 | 6/1967 | Blackstone | 56/295 |
| 3,415,047 | 12/1968 | Blecke | 56/295 |
| 3,514,935 | 6/1970 | Bonsor | 56/295 |
| 3,665,692 | 5/1972 | Hughes | 56/295 |
| 3,762,138 | 10/1973 | Michael | 56/295 |

*Primary Examiner*—Russell R. Kinsey
*Attorney, Agent, or Firm*—Robert C. Sullivan

[57] ABSTRACT

A mower blade assembly for a lawn mower, the assembly comprising a blade bar adapted to be rotated by the output shaft of the lawn mower, and a cutter blade subassembly secured to each of the opposite ends of the blade bar. Each cutter blade subassembly comprises a thin spring steel cutter member preferably of rectangular shape and preferably having a thickness in the range 0.010 to 0.025 inch. The preferred rectangular shape of the cutter blade provides four cutting edges, only one of which is used at a given time, but which may be used interchangeably by repositioning the cutter blade relative to the subassembly. The cutter blade is detachably sandwiched between the blade bar and an interchangeable propeller lift cap having an upwardly inclined end portion at the trailing end thereof relative to the direction of rotation of the blade bar. The propeller lift cap serves the dual function of (1) helping to retain the cutter blade in position on the blade bar; and (2) by means of its upwardly inclined end portion of providing a propeller action which lifts the grass before it has been cut to facilitate cutting of the grass, and also of lifting the cut grass to move it toward the discharge outlet of the lawn mower. The easy interchangeability of the propeller lift cap permits substitution of a propeller lift cap having an inclined end portion of different angular inclination and, hence, having more or less propeller lifting action, since different grass conditions require different lift; for example, wet spring grass requires more lift than dry fall grass.

6 Claims, 3 Drawing Figures

U.S. Patent  Aug 23, 1977  4,043,104
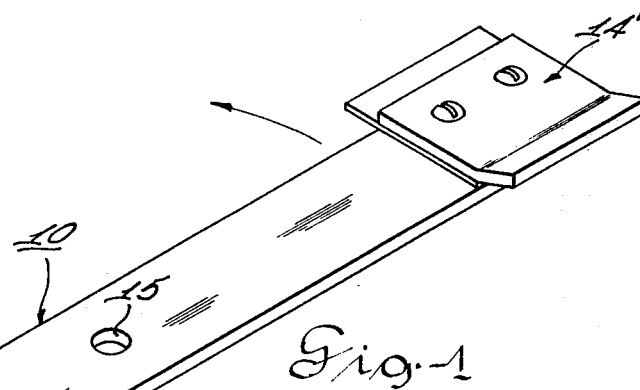
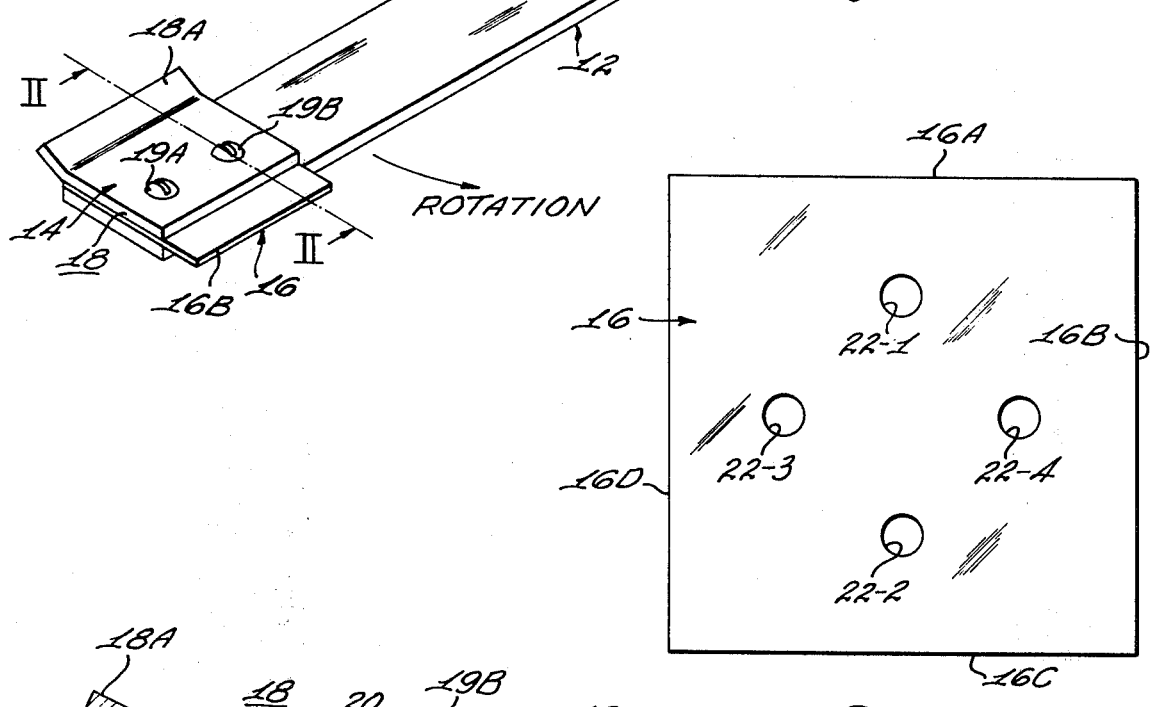
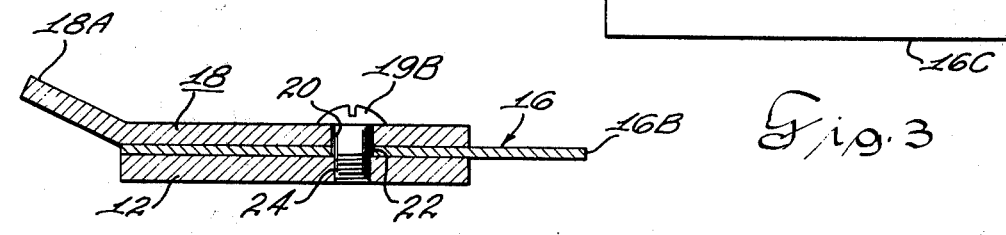

MOWER BLADE ASSEMBLY FOR A LAWN MOWER

This is a continuation of application Ser. No. 600,781, filed July 31, 1975 and now abandoned.

BACKGROUND OF THE INVENTION

This invention relates to a mower blade and to a mower blade assembly for use with a rotary lawn mower and more particularly to a mower blade of thin, hard steel in combination with an interchangeable propeller lift cap which secures the thin mower blade to a radially outer end of the rotary mower blade bar.

DESCRIPTION OF THE PRIOR ART

U.S. Pat. No. 3,596,453, issued to Derward G. Smith on Aug. 3, 1971, shows a mower blade assembly in which a cutter blade of unspecified thickness is sandwiched between a retainer plate and the rotatable cutter bar driven by the power output shaft of the mower. In the Smith patent, opposite ends of the cutter bar where the respective cutting blades are mounted are bent away from the plane of the central portion of the rotatable cutter bar to provide a lift action on the grass being cut.

U.S. Pat. No. 3,762,138, issued to Russell H. Michael on Oct. 2, 1973, shows a mower blade subassembly comprising a piece of sheet steel which is secured by rivets or the like to one end of the rotatable cutter bar or blade bar of the mower, the piece of sheet steel being folded on itself in such manner as to define a forwardly projecting cutting edge and also to define a fin portion for providing a propeller or lifting action on the grass being cut.

It is also known in the prior art to provide on a lawn mower a rotatably driven solid one piece steel blade bar on which the opposite ends of the blade bar are ground at the leading edges thereof to form the respective cutting edges of the blade bar, and the trailing edge of the blade bar is bent upwardly to provide a lifting or propeller action to lift the grass to facilitate cutting the grass and also to aid in propelling the cut grass toward the discharge outlet of the mower.

STATEMENT OF THE INVENTION

Accordingly, it is an object of the invention to provide for use with a lawn mower, a mower blade of thin, hard steel which does not require sharpening because of its natural thin edge, and which includes a plurality of cutting edges which may be selectively positioned in cutting position.

It is another object of the invention to provide a mower blade assembly for use with a rotary lawn mower or the like in which a thin cutter blade is detachably secured in place by a retaining cap plate member, or "propeller lift cap," the propeller lift cap being provided with an upwardly inclined body portion which provides a propeller or lifting action on the grass being mowed to facilitate cutting of the grass and also to facilitate movement of the cut grass toward the mower discharge outlet.

It is a further object of the invention to provide a mower blade assembly for use with a rotary lawn mower in which the mower cutter blade is detachably secured in position on the rotary blade bar by a retaining cap or a retaining plate which is so contoured as to provide the propeller or lifting function required to lift the grass as it is being cut by the mower, whereby the cutting function of the blade assembly and the propeller or lifting function of the blade assembly are performed by separate detachable elements of the blade assembly, and whereby to permit substitution of a different propeller lift cap if required for different grass cutting conditions without requiring the substitution of a different cutting blade, or to permit the substitution of a different cutter blade or to permit the repositioning of the cutter blade within the blade assembly to present a different cutting edge, without requiring substitution of a different propeller lift cap.

In achievement of these objectives, there is provided in accordance with an embodiment of the invention a mower blade assembly for a lawn mower, the assembly comprising a blade bar adapted to be rotated by the output shaft of the lawn mower, and a cutter blade subassembly secured to each of the opposite ends of the blade bar. Each cutter blade subassembly comprises a thin spring steel cutter member preferably of rectangular shape and preferably having a thickness in the range 0.010 to 0.025 inch. The preferred rectangular shape of the cutter blade provides four cutting edges, only one of which is used at a given time, but which may be used interchangeably by repositioning the cutter blade relative to the subassembly. The cutter blade is detachably sandwiched between the blade bar and an interchangeable propeller lift cap having an upwardly inclined end portion at the trailing end thereof relative to the direction of rotation of the blade bar. The propeller lift cap serves the dual function of (1) helping to retain the cutter blade in position on the blade bar; and (2) by means of its upwardly inclined end portion of providing a propeller action which lifts the grass before it has been cut to facilitate cutting of the grass, and also of lifting the cut grass to move it toward the discharge outlet of the lawn mower. The easy interchangeability of the propeller lift cap permits substitution of a propeller lift cap having an inclined end portion of different angular inclination and, hence, having more or less propeller lifting action, since different grass conditions require different lift; for example, wet spring grass requires more lift than dry fall grass.

Further objects and advantages of the invention will become apparent from the following description taken in conjunction with the accompanying drawing in which

BRIEF DESCRIPTION OF THE DRAWING

FIG. 1 is a perspective view of a mower blade assembly for a rotary lawn mower, the assembly comprising a blade bar adapted to be rotatably driven by the output shaft of a rotary-type lawn mower, the blade bar being provided at each of the opposite radial ends thereof with a mower blade subassembly in accordance with the invention;

FIG. 2 is a view in Section II—II of FIG. 1; and,

FIG. 3 is a plan view of one of the cutter blades used in the mower blade assembly of FIG. 1.

DESCRIPTION OF THE PREFERRED EMBODIMENT

Referring now to the drawing, and more particularly to FIG. 1, there is shown a mower blade assembly generally indicated at 10 including a blade bar indicated at 12. Blade bar 12 is provided with a centrally located aperture 15 which permits blade bar 12 to be secured to the end of the power-driven shaft of a rotary lawn mower (not shown). Blade bar 12 rotates with the output shaft of the lawn mower and it is assumed in the illustrated embodiment that blade bar 12 rotates in a counterclockwise direction with respect to the view shown in FIG. 1 of the drawing. Blade bar 12 may be made of a material such as low carbon steel and typically may have the following approximate dimensions which are given only by way of example: 21 × ¼ × 1½ inches.

At each of the diametrically opposite ends of blade bar 12 is mounted a cutter blade subassembly each respectively indicated at 14 and 14'. Since each of the subassemblies 14 and 14' is the same as the other, only the subassembly 14 will be described, it being understood that the other cutter blade subassembly 14' is similar.

Cutter blade subassembly 14 comprises a cutter blade generally indicated at 16 and a retaining plate or propeller lift cap member generally indicated at 18 which serves to hold cutter blade 16 in place at the end of the blade bar 12 and which also serves to provide a lifting action on the grass as will be explained hereinafter.

Referring now to FIG. 3, there is shown a plan view of cutter blade 16 which is formed of hardened thin, spring steel (i.e., a high quality alloy steel) of approximately two inches square in dimension (i.e., two inches in length along each edge thereof). Cutter blade 16 preferably has a thickness in the range of 0.010 to 0.025 inch, and should not exceed 1/16 inch (0.0625 inch) in thickness. Cutter blade 16 has four edges indicated at 16A, 16B, 16C and 16D, respectively, which can be used interchangeably as the cutting edge. In the assembled views of FIGS. 1 and 2, it is assumed that the edge 16B is being used as the cutting edge. Cutter blade 16 is sandwiched between the normally upper surface of blade bar 12 and the normally under surface of propeller lift cap 18, as best seen in the views of FIGS. 1 and 2. Propeller lift cap 18 is detachably secured in overlying and retaining position to cutter blade 16 and to the end of blade bar 12 by two retaining headed bolts individually indicated at 19A and 19B. In the illustrated embodiment bolts 19A and 19B each respectively pass through an unthreaded passage 20 in propeller lift cap 18, and through aligned unthreaded passage 22 in cutter blade 16, the respective bolts 19A, 19B then threading into a corresponding threaded passage 24 in blade bar 12. Cutter blade 16 is typically about ½ inch wider in a left to right direction than blade bar 12 relative to the views in the drawing and, hence, approximately ½ inch of the width of cutter blade 16 projects beyond the right-hand edge relative to the view shown in FIGS. 1 and 2 of rotating blade bar 12 (i.e., the leading edge of the blade bar 12 relative to the direction of rotation of the blade bar 12). As will be seen in FIGS. 1 and 2, the left-hand edge of cutter blade 16 relative to the views of FIGS. 1 and 2 is flush with the left-hand or trailing edge of blade bar 12. Propeller lift cap 18 is wider than the transverse dimension of blade bar 12 and includes an upwardly bent portion indicated at 18A to provide a propeller or lifting-type action on the grass, the upwardly bent portion 18A projecting rearwardly of the trailing edge of blade bar 12 and of cutter blade 16 relative to the direction of rotation of blade bar 12.

Propeller lift cap 18 may be formed of a material such as low carbon steel, and typically may have dimensions approximately as follows: ⅛ × 2 × 2½ inches. As seen in the views of FIGS. 1 and 2, the right-hand (or leading edge relative to the direction of rotation) of propeller lift cap 18 is flush with the corresponding edge of blade bar 12.

The cutter blade subassembly at each end of the blade bar 12, as hereinbefore described, has numerous advantages. By detaching bolts 19A and 19B, the cutting blade 16, which is shown with the blade edge 16B in cutting position in the views of FIGS. 1 and 2, can be rotated through an angle of 90° so that the cutting edge 16A is instead in the cutting position in a similar manner to that shown in FIGS. 1 and 2. Any one of the four edges, 16A, 16B, 16C or 16D, of the respective cutter blades 16 can be exposed as the cutting edge, bolts 19A and 19B then being retightened to hold subassembly 14 in assembled relation. To permit the interchangeability of the four cutting edges, 16A, 16B, 16C and 16D as just described, the cutter blade 16 is provided with four apertures 22 therethrough which are respectively individually identified as 22-1, 22-2, 22-3 and 22-4. The apertures 22-1 and 22-2 lie on an axis perpendicular to the edges 16A and 16C of cutter blade 16 while the apertures 22-3 and 22-4 lie on an axis perpendicular to the edges 16B and 16D. In any given position of cutter blade 16, only one set of apertures, such as 22-1 and 22-2 is used to receive the bolts 19A and 19B. However, if, for example, cutter blade 16 is rotated through a 90° angle to place the cutting edge 16A in cutting position, then the apertures 22-3 and 22-4 of cutter blade 16 are in proper registration with the corresponding apertures 20 in propeller lift cap 18 and with the threaded passages 24 in blade bar 12 to receive bolts 19A and 19B.

The thinness of cutting blade 16 eliminates any requirement for sharpening the cutting edge and the thin cutting edges 16A, 16B, etc. will never dull to a greater thickness than their own natural thinness. The thickness dimension of the cutter blade 16 is such that the normal thickness of the blade has a sufficiently sharp cutting edge without any sharpening. Furthermore, the sharpness of the cutting edges of cutter blade 16 provided by the thin thickness dimension of cutter blade 16 requires less cutting energy and therefore provides a more efficient cutting action by cutter blade 16. The thin cutting edge of cutter blade 16, such as 16A, 16B, 16C or 16D will break upon impact and thereby minimize the velocity of any object, such as a rock, for example, accidently hit and thrown by impact with the cutter blade.

The cutter blade subassembly shown and described also provides easy interchangeability of propeller lift cap 18, if required for different grass conditions, for example. As previously explained, propeller lift cap 18 serves the function not only of retaining cutter blade 16 in position on blade bar 12, but additionally, due to the provision of inclined body portion 18A of propeller lift cap 18, provides a propeller action for the air in the path of rotation of the cutter blade subassembly which causes the rising air to lift the grass before it has been cut to aid in the cutting action and also provides a lifting action which aids in propelling the cut grass toward the discharge outlet of the lawn mower.

The interchangeability of the removable propeller lift cap 18 permits the substitution of a lift cap 18 having a different angular tilt of the upwardly inclined body portion 18A of the propeller lift cap 18, if required. Different grass conditions require different degrees of lifting action. For example, wet spring grass requires more lift and fuel than dry fall grass. Thus, it is desirable that when the lawn mower is being used to cut wet spring grass, for example, it be provided with a removable propeller lift cap 18 having an inclined body portion 18A of a different lift angle than if the mower is being used to cut dry fall grass which requires less lift than the wet spring grass. More specifically, when the mower is being used to cut wet spring grass, a propeller lift cap 18 should be used having a body portion 18A inclined at a greater or steeper angle relative to the horizontal plane than in the case where the mower is being used to cut dry fall grass. A propeller lift cap having an inclined body portion 18A of steeper angular inclination, as required for wet spring grass, provides greater lifting action but at the same time requires more driving energy from the mower engine, and hence consumes more fuel than a propeller lift cap whose inclined body portion 18A is of a less steep angle, as would be appropriate for cutting dry fall grass. Applicant's construction permits easy interchangeability and substitution of a different propeller lift cap appropriate for the lift required for the condition of the particular grass being cut without requiring substitution of a different cutter blade. Furthermore, the easy interchangeability of the propeller lift cap to permit substitution of a propeller lift cap having a lift characteristic appropriate for the condition of the grass being cut, as just explained, permits more economical use of the fuel used to drive the mower.

The construction hereinbefore described also has advantages over the prior art solid one-piece rotatable blade bar on which the cutting edges are formed directly on the blade bar, in that the construction of the present invention using cutter blades which are separate from the rotatable blade bar permits the blade bar to be constructed of a suitable but less expensive material than the material of the cutter blades. In contrast, in the prior art one-piece construction the blade bar and the cutting edges were of necessity formed of the same material in order to satisfy the material requirements of the cutting edges with the result that the rotatable blade bar was formed of a higher quality, and consequently more expensive, material than needed to perform its blade-supporting function.

From the foregoing detailed description of the invention, it has been shown how the objects of the invention have been obtained in a preferred manner. However, modifications and equivalents of the disclosed concepts as readily occur to those skilled in the art are intended to be included within the scope of this invention.

The embodiments of the invention in which an exclusive property or privilege is claimed are defined as follows:

1. A mower blade assembly comprising a blade bar adapted to be rotated by the output shaft of a lawn mower, and a cutter blade subassembly secured to each of the opposite ends of said blade bar, each subassembly comprising a detachable thin metal cutter blade member made of a metal having a thickness no greater than about 0.0625 inch, said cutter blade member being provided with a plurality of cutting edges only one of which is in use in a given assembled position of said subassembly, said cutter blade member being orientable by reassembly of said subassembly to position any one of said cutting edges of said cutter blade member in cutting position, said cutter blade member being so positioned in said subassembly that the cutting edge of said cutter blade member which is in use in a given assembled position of said subassembly lies forwardly in a leading direction of the leading edge of said blade bar relative to the direction of rotation of said blade bar, and a detachable interchangeable propeller lift cap distinct from said cutter blade member and in retaining relation to said cutter blade member whereby said cutter blade member is sandwiched between said blade bar and said lift cap, said propeller lift cap including an upwardly bent body portion contiguous the trailing end of said lift cap relative to the direction of rotation of said blade bar, whereby to provide a lifting action on the grass, and means securing said cutter blade member and said lift cap in detachably assembled relation with respect to each other and with respect to said blade bar.

2. A mower blade assembly as defined in claim 1 in which said blade member is made of spring steel having a thickness substantially in the range 0.010 to 0.025 inch.

3. A mower blade assembly as defined in claim 1 in which said blade member is of rectangular shape and includes four cutting edges defining the perimeter of said blade member.

4. A cutter blade subassembly adapted to be secured to an end of the rotary blade bar of a lawn mower, said subassembly comprising a detachable thin metal cutter blade member made of a metal having a thickness no greater than about 0.0625 inch, said cutter blade member being provided with a plurality of cutting edges only one of which is in use in a given assembled position of said subassembly, said cutter blade member being orientable by reassembly of said subassembly to position any one of said cutting edges of said cutter blade member in cutting position, said cutter blade member being so positioned in said subassembly that the cutting edge of said cutter blade member which is in use in a given assembled position of said subassembly lies forwardly in a leading direction of the leading edge of said blade bar relative to the direction of rotation of said blade bar, and a detachable interchangeable propeller lift cap distinct from said cutter blade member and in retaining relation to said cutter blade member whereby said cutter blade member is adapted to be sandwiched between said blade bar and said lift cap, said lift cap including an upwardly bent body portion contiguous the trailing end of said lift cap relative to the direction of rotation of said blade bar, whereby to provide a lifting action on the grass, said cutter blade member and said lift cap being adapted to be secured in detachably assembled relation with respect to each other and with respect to said blade bar.

5. A cutter blade subassembly as defined in claim 4 in which said blade member is made of spring steel having a thickness substantially in the range 0.010 to 0.025 inch.

6. A cutter blade subassembly as defined in claim 4 in which said blade member is of rectangular shape and includes four cutting edges defining the perimeter of said blade member.

* * * * *